(12) United States Patent
Saitoh et al.

(10) Patent No.: US 6,189,110 B1
(45) Date of Patent: *Feb. 13, 2001

(54) DISK DEVICE AND DATA REASSIGNMENT METHOD

(75) Inventors: Takahiro Saitoh, Yokohama; Akira Kibashi, Zama; Kenji Okada; Hideki Ohzeki, both of Yokohama, all of (JP)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/958,774

(22) Filed: Oct. 27, 1997

(30) Foreign Application Priority Data

Oct. 25, 1996 (JP) .................................... 8-283860

(51) Int. Cl.$^7$ ............................. G06F 11/00; G11B 20/10
(52) U.S. Cl. ................................. 714/8; 714/710
(58) Field of Search ............................. 714/8, 7, 6, 710, 714/711; 360/47; 711/114, 4

(56) References Cited

U.S. PATENT DOCUMENTS

| 5,210,660 | * | 5/1993 | Hetzler ................................... 360/48 |
| 5,636,355 | * | 6/1997 | Ramakrishnan et al. ............ 711/113 |
| 5,768,044 | * | 6/1998 | Hetzler et al. ..................... 360/78.14 |
| 5,822,142 | * | 10/1998 | Hicken ................................. 714/723 |
| 5,848,438 | * | 12/1998 | Nemazie et al. ......................... 711/4 |

FOREIGN PATENT DOCUMENTS

| 428208 | 5/1991 | (EP) | ............................... G11B/20/18 |
| 447246 | 9/1991 | (EP) | ............................... G11B/5/012 |
| 4-137032 | 5/1992 | (JP) | ................................. G06F/3/06 |
| 4-3367 | * | 11/1993 | (JP) | ............................. G11B/20/10 |
| 5-303837 | * | 11/1993 | (JP) | ............................. G11B/20/10 |
| 40-6068602 | * | 3/1994 | (JP) | ............................. G11B/20/12 |
| 8-272544 | 10/1996 | (JP) | ................................. G06F/3/06 |
| 10-92116 | 4/1998 | (JP) | ............................. G11B/20/12 |
| WO95/24038 | 9/1995 | (WO) | ............................. G11B/20/18 |

* cited by examiner

Primary Examiner—Robert W. Beausoliel, Jr.
Assistant Examiner—Christopher A. Revak
(74) Attorney, Agent, or Firm—G. Marlin Knight

(57) ABSTRACT

A disk device and a method are described for reassigning data areas (e.g. sectors) which minimize the reduction in the data transfer rate when alternate data areas are used to replace defective areas. The disk device uses a plurality of data zones with spare areas allocated in each data zone. An alternate area is allocated (a) in the spare area within the data zone where the error occurs and (b) at an angular position offset more than a predetermined angle from a position of the data in which the error occurs. The offset angle allows the device time to seek to the alternate area, read the alternate area and seek back to the area following the defective area within a single rotation of the disk.

20 Claims, 5 Drawing Sheets

DISK DEVICE AND DATA REASSIGNMENT METHOD

FIELD OF THE INVENTION

The present invention relates to the field of error processing in a disk device. More specifically, the invention relates to a disk device and method which execute transfer of data when an error occurs, that is, data reassignment.

BACKGROUND OF THE INVENTION

A disk device is one which records data on tracks formed on a disk and also regenerates the recorded data from the disk tracks. The data recording and regeneration is performed by a head with a transducer. When recording or regenerating data, the head (also called a slider) is positioned by an actuator over a desired track on a disk where data has been recorded or will be recorded. By rotation of the disk, the head passes over a desired sector where data has been recorded or will be recorded and then performs data recording or regeneration.

If the size of data is large and exceeds the capacity of a single sector when the data is recorded, the excess data will usually be recorded on sectors which are continuous in the circumferential direction of the disk. In the case where the sectors on the same track have all been used, a head is moved to an adjacent track and data recording is continued. It is known to those having skill in this field that by arranging data in this way, the recording and regeneration of continuous data can be performed at high speed.

However, if data recording or regeneration is not performed accurately for defects such as defects in disks, errors will occur. There are recoverable soft errors and unrecoverable hard errors by rereading, etc. In the case where a hard error occurred in a certain sector, there has hitherto been performed data reassignment or alternate sector assignment which records the data of that sector on a spare or alternate sector.

On the other hand, to meet the low-cost and large-capacity requirements of disk devices in recent years, various techniques to enhance recording density have been developed. One of them is a technique called zone bit recording (ZBR). In the ZBR method, the surface of a disk is segmented into a plurality of concentric and circular areas called zones, and each zone has a plurality of tracks. The clock frequencies for recording and regeneration are equal for tracks in the same zone, but between zones the clock frequency for recording and regeneration is higher as the zone gets nearer to the outer circumference of the disk. In this way, the recording capacity of the entire disk can be increased.

In FIG. 1 there is shown the disposition of a spare sector on a disk which adopts the ZBR technique. The data area on which data is stored is divided from zone 0 which is the outermost circumferential zone up to zone N which is the innermost circumferential zone. A area for data reassignment is provided inside the zone N, and the spare sector is disposed in this area. A track for data reassignment is called a spare track, which comprises one or a plurality of tracks. When data reassignment is performed for each zone, the spare sector is disposed not in the zones but in the spare track.

In FIG. 2 there is shown the read operation of a head in the case where in the conventional example of FIG. 1 defective sector D exists in the zone 0 and where the data on the sector D is reassigned to spare sector S, i.e. the alternate sector, on the spare track.

(1) The head attempts to read out data from the defective sector D but knows that the data on the sector D has been reassigned to the alternate sector S.

(2) The head seeks a spare track on which the spare sector S is present. During this operation, the head is substantially in a full-track seek state.

(3) The head follows the spare track, on which the alternate sector S is present, to read out the data on sector S.

(4) The head seeks a track on which a sector next to the defective sector D is present. During this operation, the head is substantially in a full-track seek state.

(5) The head follows the track, on which the sector next to the defective sector D is present, to read out the data on the sector next to the defective sector D.

In the aforementioned example, a full-track seek operation is performed twice and a track follow operation is performed twice. Therefore, the total time of the time required for two full-track operations and the time required for two track follow operations is required until the data on the sector next to the sector D has been read out after the attempt to read out the data on the sector D. For example, when the full-track seek time is 10 ms and the rotational speed of the disk is 5400 rpm (about 11 ms per revolution), the track follow time is between 0 and 11 ms. Therefore, 42 ms, that is, the time required for the disk to make four revolutions, is required at the maximum, and 20 ms, that is, the time required for the disk to make two revolutions, is required at the minimum. This becomes the cause of a temporary reduction in the data transfer rate.

With an increase in the number of multimedia applications and an enlargement in the capacity of disk devices, the chance to regenerate multimedia applications with disk devices is increasing in recent years. If the aforementioned reduction in the data transfer rate arises in the application for performing image regeneration or voice regeneration at real time, among others, a phenomenon where images or voices stop for a moment will take place, so a solution has been demanded.

SUMMARY OF THE INVENTION

An objective of the present invention is to provide a disk device and a data reassignment method which minimize a reduction in the data transfer rate.

Another objective of the present invention is to provide a disk device and a data reassignment method which are suitable for regeneration of multimedia applications.

According to a preferred form of the present invention, in a disk device with a plurality of data zones, an alternate sector for a data area or sector in a data zone is disposed:

(a) in a spare area within the data zone in which the data area having an error occurs; and also (b) at a position spaced more than a predetermined radial angle relative to the center of a disk from a position of the data in which the error occurred.

By insuring that a minimum angular offset exists from the original data area and the alternate data area (in both directions), the head can seek from the original data area to the alternate data area, read it, and seek back to the area following the original data area to continue reading the data following the defective track without losing an additional revolution. (One revolution is necessarily lost during the seek-read-seek sequence). The alternate data area (or sector) is positioned so that in the time required for a head to move from an arbitrary radial position (e.g. track) in a data zone to the spare area in that zone, the disk will not have rotated past the alternate data area. If the alternate sector is positioned approximately 180 degrees from the bad sector, then approximately equal time is available for each of the seeks, but if the maximum seek time to the spare area (or track) is less than the time required for the disk to rotate approximately 180 degrees, then the offset angle may be reduced accordingly. In a device with multiple disks and/or multiple surfaces, the alternate area may be assigned on any of the surfaces, since the disks rotate together and are all zoned alike. Thus, if a usable alternative area is unavailable on the surface with the bad area, then a similarly positioned free area on another surface may be used. In a preferred embodiment the spare areas are located in approximately the center of the data zones to achieve a low worst case seek time from an arbitrary data area to the spare area.

DESCRIPTION OF THE PREFERRED EMBODIMENT

Figure 1:
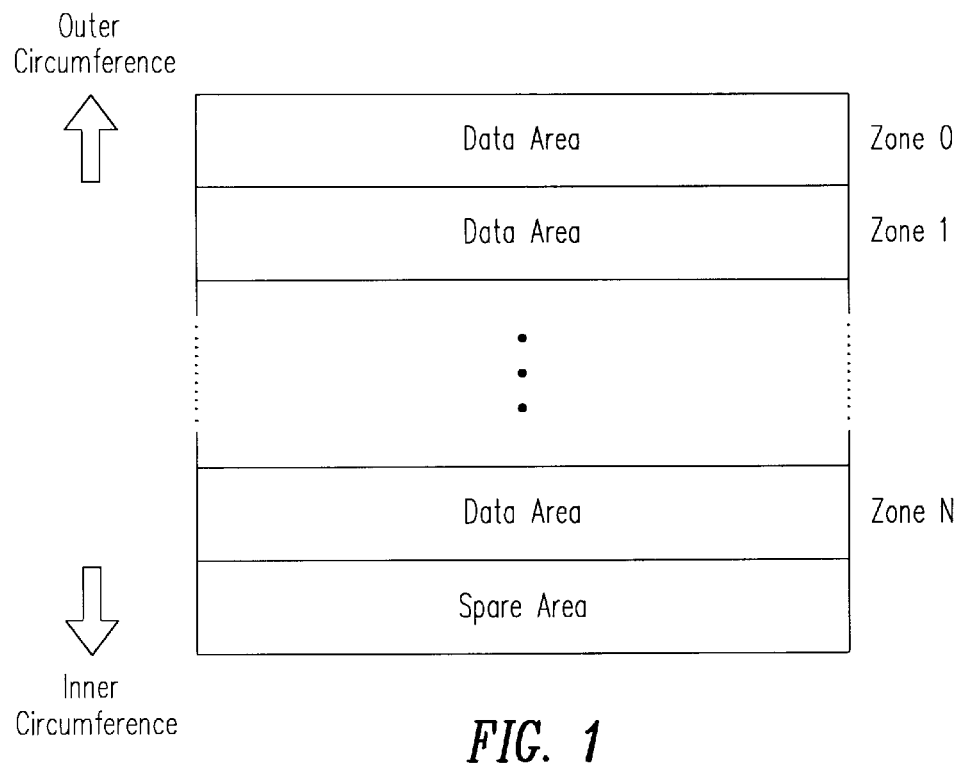
FIG. 1 is a diagram showing the disposition of a spare area in background art.
Figure 2:
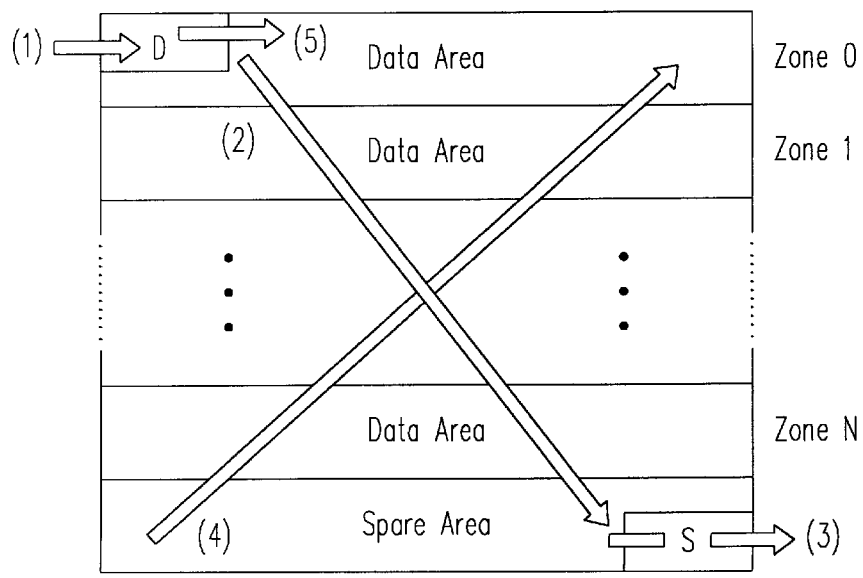
FIG. 2 is a diagram showing how a head in FIG. 1 is operated.
Figure 3:
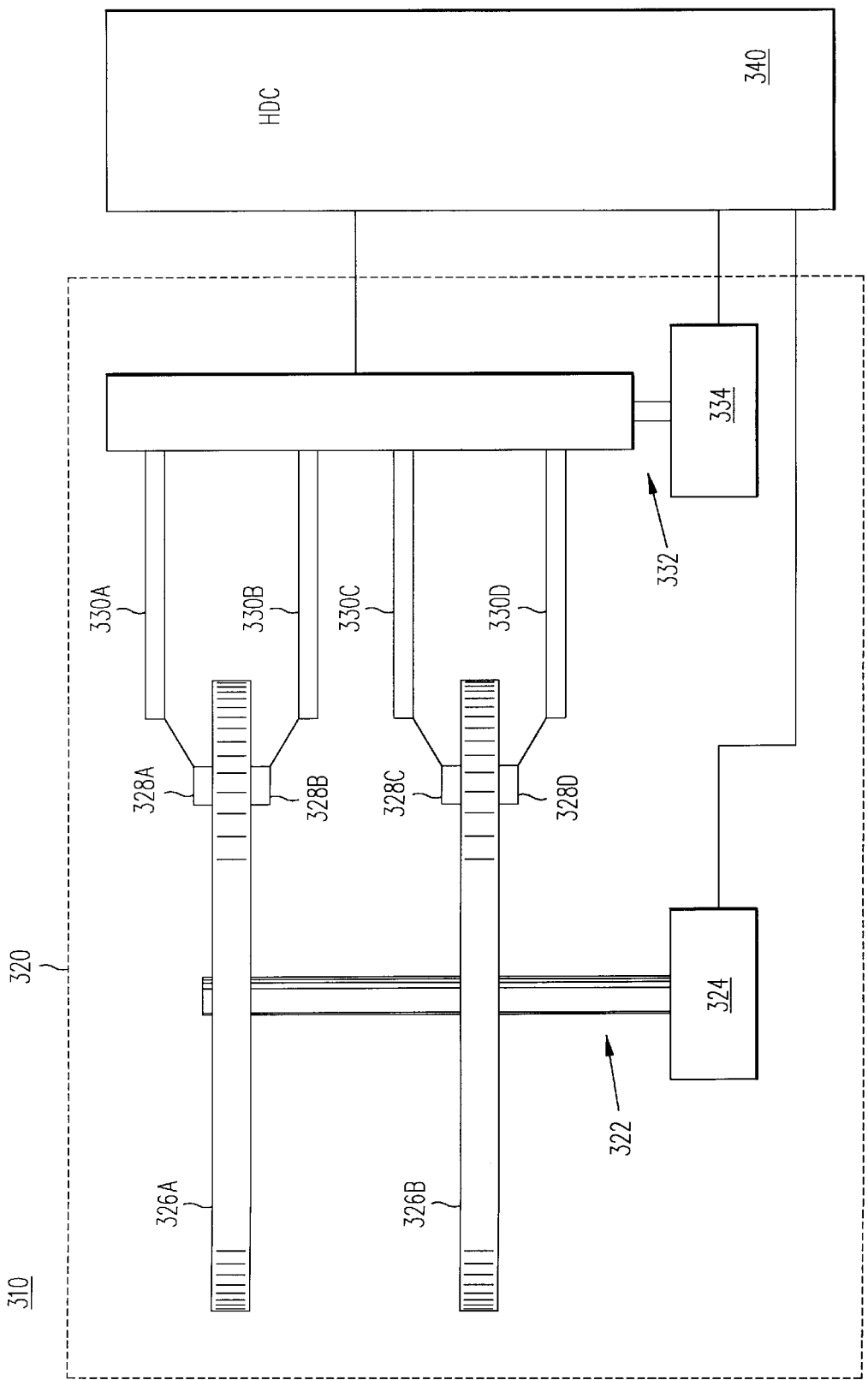
FIG. 3 is a schematic diagram showing a disk device according to an embodiment of the present invention.

FIG. 3 shows an example of a disk device to which the present invention is applied. As shown in FIG. 3, the disk device 310 is constituted by a disk enclosure 320 and a hard-disk controller (HDC) 340. The disk enclosure 320 is equipped with a motor 324 which is used to spin a spindle 322. Disks 326A and 326B are mounted on the spindle 322 so that they rotate integrally with the spindle 322. In the example of FIG. 3, there are two disks, but one disk or three or more disks may be present.

Heads 328A, 328B, 328C, and 328D are supported and disposed by actuator arms 330A, 330B, 330C, and 330D so that each head is opposed to the corresponding disk surface. The actuator arms 330A through 330D are attached to a voice coil motor (VCM) 334 through a pivot shaft 332. If the pivot shaft 332 is rotated, each of the heads 328A through 328D can be positioned at a desired radial position on the disk. The motor 324 and the VCM 334 are connected to the HDC 340 so that the number of rotations or rotational speed can be controlled. The HDC 340 is connectable to a host computer.

Data tracks are concentrically formed on a magnetic disk. The reading or writing of information is performed after a seek operation where the magnetic disk is rotated and where also the head is moved along the radial direction of the magnetic disk so that it is positioned over a specific data track. The operation of positioning the head over a specific data track is performed by reading out the head position identification information (servo information) prerecorded on the magnetic disk by the head.

After the positioning of the head over the desired track, data reading or writing is performed. At this time, there are some cases where reading or writing failure of accurate data, that is, errors occur. Most of the errors which occur on disks are caused by data loss. There are many cases where this data loss is caused by damages such as scratches on disks which occurred with the passage of time and a specular change in magnetic material. The reading of data from disks is usually executed under standard reading conditions set between a disk, a head, and a HDC.

Using these predetermined standard conditions, data reading is performed. When errors occur, data reading is again executed to recover errors by intentionally reducing a follow-up speed or maintaining the amplification factor of automatic gain control (AGC) for signal amplification constant. The error recovery based on these changes in the reading condition is performed by starting an error recovery procedure (ERP) which executes a plurality of error recovery routines in sequence.

If an error is not removed by the aforementioned ERP, the error will be recognized as a hard error and a data reassignment operation will be performed which records the data for the bad sector on a spare sector which becomes the alternative sector for bad sector.

Figure 4:
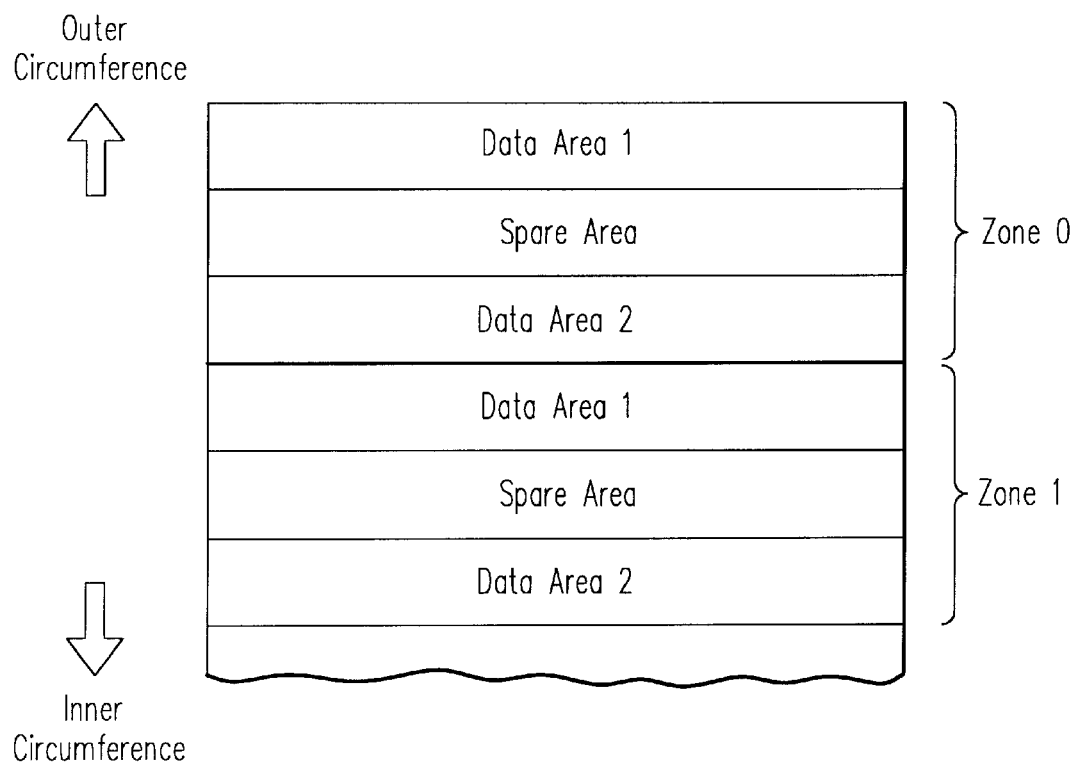
FIG. 4 is a diagram showing the disposition of a spare area in the present invention.

In FIG. 4 the location of the spare sectors is shown on a disk according to the present invention. In the figure, zone 0 includes one spare track or two or more spare tracks predisposed in approximately the central portion of the zone 0. That is, the data area of the zone 0 is segmented into data area 1 and data area 2 by the spare track of the zone 0. The spare track includes a plurality of spare sectors. Also, the spare track is disposed so that the time required for the head to get from an arbitrary radius position in the data area to the spare track, often called the seek time, is within a predetermined time, for example, the time required for the disk to rotate in a 180-degree arc. It is preferable that the zone 0 be disposed in the radial central portion of the zone 0. For zone 1, a spare track is likewise disposed. Also, in FIG. 4, only two zones, the zones 0 and 1, are shown, but the same may be said of the case of three or more zones.

Figure 5:
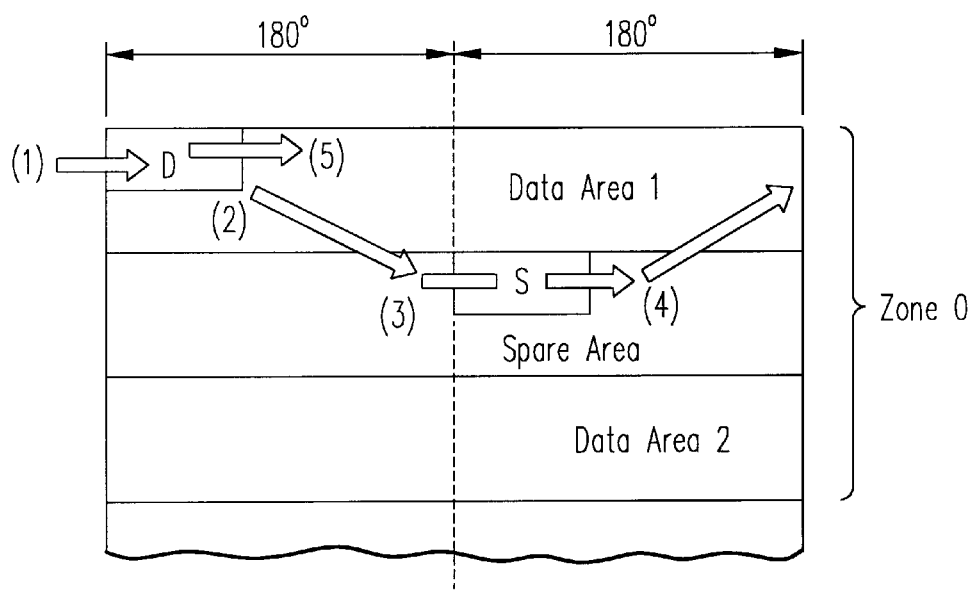
FIG. 5 is a diagram showing how the head in FIG. 4 is operated.

In FIG. 5 there is shown the read operation of the head in the case where in FIG. 4 defective sector D exists in the zone 0 and where the data on the sector D is reassigned to spare sector S on the spare track at a position (spaced about 180 degrees in the rotational direction) on approximately the opposite side with respect to the center of the disk.

(1) The head attempts to read out data from the defective sector D but knows that the data on the sector D has been reassigned to the spare sector S.

(2) The head seeks a spare track on which the spare sector S is present. During this operation, the head seeks approximately the half width of the zone 0.

(3) The head follows the spare track, on which the spare sector S is present, to read out the data on the spare sector S.

(4) The head seeks a track on which a sector next to the defective sector D is present. During this operation, the head seeks approximately the half width of the zone 0.

(5) The head follows the track, on which the sector next to the defective sector D is present, to read out the data on the sector next to the defective sector D.

In the aforementioned example, a seek operation for about half of the width of approximately the zone 0 is performed twice and a track follow operation is performed twice. Therefore, the total time of the time required for two seek operations for about half of the width of approximately the zone 0 and the time required for two track follow operations is required until the data on the sector next to the sector D has been read out after the attempt to read out the data on the sector D. For example, when the seek time for about half of the width of approximately the zone 0 is 5 ms and the rotational speed of the disk is 5400 rpm (about 11 ms per revolution), the track seek operation (the aforementioned operations (1) and (2)) is completed during the time the disk rotates in a 180-degree arc (about 5.5 ms). Therefore, as soon as the disk rotates in a 180-degree arc, the disk can read out the spare sector S. That is, in this case the track follow time will be about 0.5 ms. In the case (the operation (3)) where the track on which the sector next to the defective sector D is present is sought after the alternate sector has been read out, it likewise takes 5 ms. Also, it takes 0.5 ms for the disk to follow the track to read out the data on the sector next to the defective sector D (the operation (4)). Thus, the time the operations (1) through (4) take will be about 11 ms and equivalent to the time it takes for the disk to make one revolution. In this embodiment, the alternate sector S has been disposed at the position where the disk rotated through 180 degrees. However, as can be understood from the aforementioned description, the alternate sector S may be disposed so that it will be spaced an angle (more than 180 degrees×5/5.5 for this case) more than the angle through which the disk rotates for the track seek time.

Figure 6:
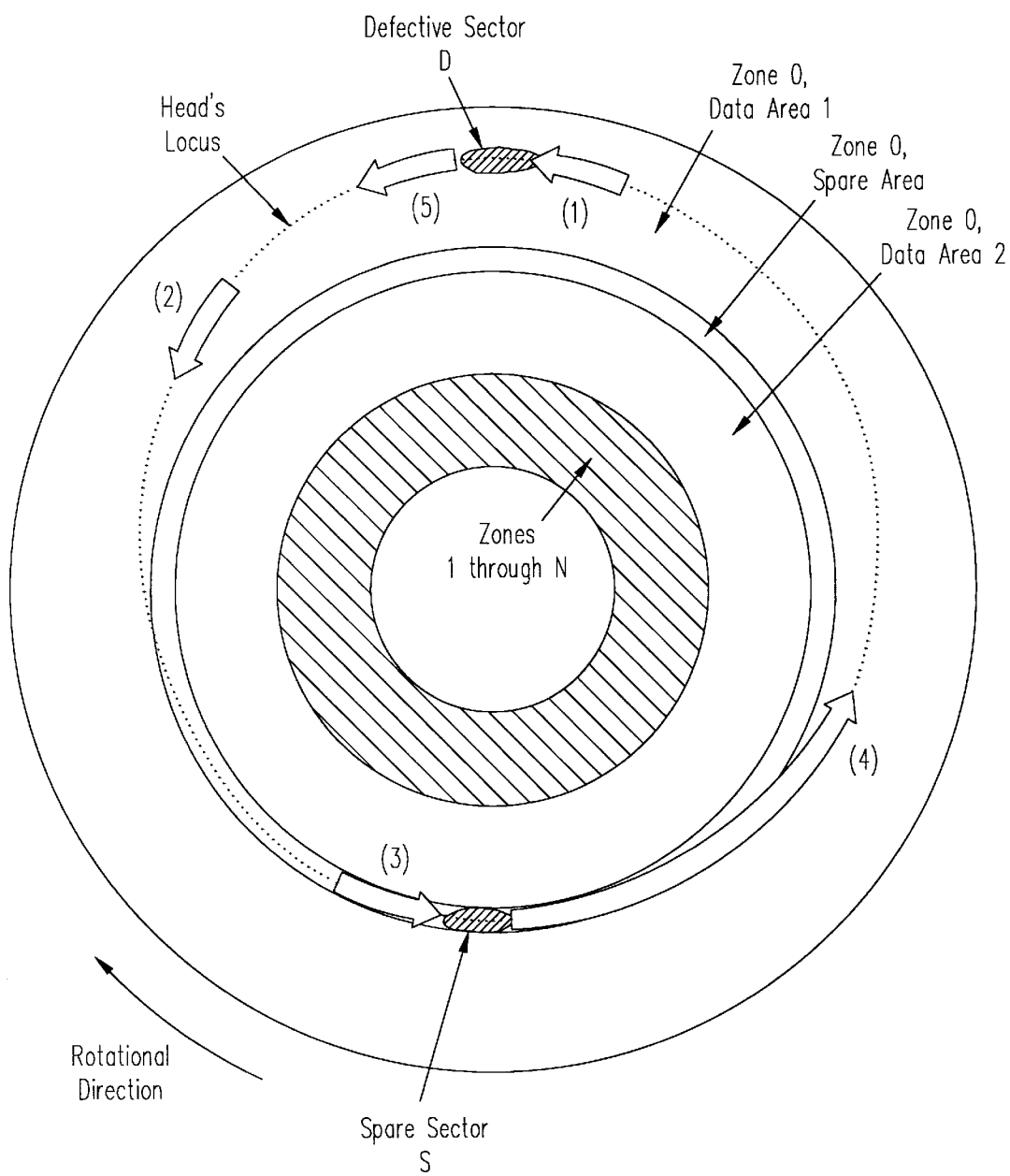
FIG. 6 is a diagram showing the locus on the disk of the operation of the head in FIG. 5.

In FIG. 6 there is shown the locus on the disk of the operation of the head in FIG. 5. In the figure the zone 0 is depicted in exaggeration so that the locus can be easily viewed.

Also, reference numbers (1) through (4) correspond to the operations (1) through (4) in FIG. 5, respectively.

Figure 7:
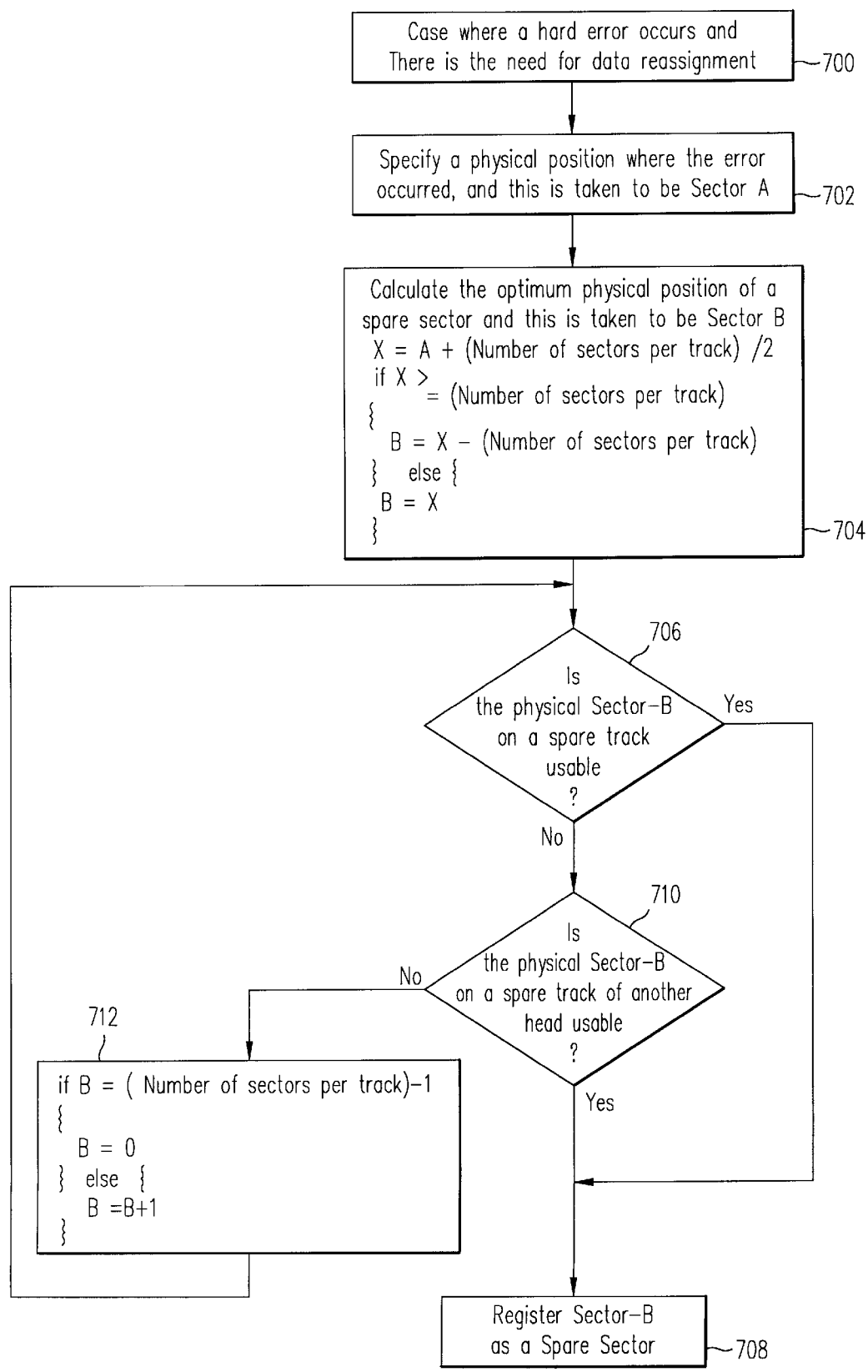
FIG. 7 is a flowchart showing a method of reassigning a spare sector.

In FIG. 7 there is shown a method of allocating a spare sector. In step 700, when an error occurs as the data is read from or written to a desired sector, it is not recovered even by the ERP, and needs to be reassigned, the steps thereafter are executed by the HDC 340. In step 702 the physical position (address) of the aforementioned defective sector is taken to be sector A. In step 704 the optimum physical position of a spare sector is calculated and this is taken to be sector B. The value of B is calculated as follows:

(1) Let X=A+(number of sectors per track)/2.

(2) When X≧(number of sectors per track), let B=X−(number of sectors per track).

(3) When X<(number of sectors per track), let B=X.

In step 706 it is checked whether the sector B on the spare track has already been used or not and it is judged whether the sector B is usable or not. If the sector B is usable, in step 708 it will be registered as an alternate sector. If the sector B is unusable, step 706 will advance to step 710. In step 710 it is judged whether the sector B on the spare track of another head (disk surface) is usable or not. If the sector B is usable, in step 708 it will be registered as an alternate sector A. If the sector B is unusable, step 710 will advance to step 712. In step 712 the physical position of the following sector is calculated and this is taken to be sector B. The value of B is calculated as follows:

(1) When B=(number of sectors per track)−1, let B=0.

(2) When B≠(number of sectors per track)−1, let B=B+1.

After calculation of the value of B, step 712 returns to step 706.

These steps are stored on memory such as a ROM in the HDC. Also, all or some of these steps may be stored on a disk. In that case, data is read out from the disk when the hard-disk device is started, and the data is stored on a memory, such as a RAM, for execution.

As has been described above, when conventional data reassignment is performed, the time required for two rotations of a disk at least and the time required for four rotations of a disk at most are required until the data on the sector next to a defective sector is read out after an attempt to read out the data on the defective sector. On the other hand, in the present invention, only the time required for one rotation of a disk is required, so a reduction in the data transfer rate can be minimized.

We claim:

1. A disk device comprising:

a first recording disk with at least one surface with a plurality of data zones comprising a plurality of tracks with each data zone having a spare area;

a head for recording or reproducing data to or from the recording disk;

an actuator for moving the head radially on the surface of the first recording disk;

a motor for rotating the first recording disk; and data reassigning means for assigning an alternate data area for storing data to replace a first data area at a first angular position in a first track in a first data zone in which an error occurs, the alternate data area being selected in part based on angular position in a first spare area in the first data zone in a second track and at a second angular position which is offset from the first angular position by at least a selected angle which allows the actuator to move the head from the first track to the second track before the first recording disk rotates from the first angular position to the second angular position.

2. The disk device as set forth in claim 1, wherein the first data zone includes a plurality of tracks subdivided into sectors, the first spare data area includes a plurality of sectors and the predetermined angle is an angle through which the disk rotates during a maximum time required for the head to seek from an arbitrary track in the first data zone to the spare data area.

3. The disk device as set forth in claim 1, wherein the predetermined angle is substantially 180 degrees.

4. The disk device as set forth in claim 1, wherein the first recording disk has first and second surfaces with a plurality of data zones each having a spare data area, the data reassigning means further comprising means for assigning the alternate data area on the second surface when the spare data area on the first data zone on the first surface at the second angular position is unavailable.

5. The disk device as set forth in claim 1, wherein the first spare area is disposed substantially in a center of the first data zone and a second spare area is disposed substantially in a center of a second data zone.

6. The disk device as set forth in claim 1, wherein the predetermined angle is greater than or equal to an angle through which the first recording disk rotates in a maximum time required to seek from an arbitrary position in the first data zone to the first spare area.

7. The disk device as set forth in claim 1, further comprising a plurality of recording disks with first and second surfaces with a plurality of data zones each having a spare data area, the plurality of recording disks being mounted on a common spindle with the first recording disk, the plurality of data zones on the surfaces of the plurality of recording disks being aligned with the plurality of data zones on the first recording disk, and wherein the data reassigning means further comprises means for assigning the alternate data area in the first spare area on a second recording disk surface when no usable spare data area exists in the first data zone on the first recording disk.

8. The disk device as set forth in claim 7, wherein the first spare area on the first recording disk is disposed substantially in a center of the first data zone on the first recording disk and a second spare area on the first recording disk is disposed substantially in a center of a second data zone on the first recording disk.

9. The disk device as set forth in claim 8, wherein the predetermined angle is greater than or equal to an angle through which the first recording disk rotates in a maximum time required to seek from an arbitrary position in the first data zone to the first spare area in the first data zone.

10. The disk device as set forth in claim 9, wherein the predetermined angle is substantially 180 degrees.

11. The disk device as set forth in claim 1, further comprising means for executing a read operation specifying the first data area, a second data area preceding the first data area and a third data area following the first data area, the first data area having been assigned an alternate data area on a first track, the means for executing including:
means for seeking to a second track where the second data area is located;
means for reading the second data area;
means for seeking to the first track on which the alternate data area is located in less than or equal to a time in which the first recording disk rotates 180 degrees;
means for reading the alternate data area;
means for seeking to the second track before the first recording disk rotates past the third data area, and
means for reading the third data area.

12. A method of operating a disk device comprising the steps of:
dividing a first recording disk with a first surface into a plurality of data zones each having a spare area and each data zone comprising a plurality of tracks;
detecting that an error exists in a first data area at a first angular position on a first track in a first data zone;
selecting a first alternate data area in the spare area on a second track at a second angular position, the spare area being at least a predetermined angle displaced from the first angular position which allows the actuator to move the head from the first track to the second track before the first recording disk rotates from the first angular position to the second angular position.

13. The method as set forth in claim 12, wherein the predetermined angle is an angle through which the disk rotates in the time required for the head to get from an arbitrary radial position in the first data zone to an arbitrary radial position in the first spare area.

14. The method as set forth in claim 12, wherein the predetermined angle is substantially 180 degrees.

15. The method as set forth in claim 12, further comprising the step of selecting the first alternate data area in a spare area on a second disk surface when the first spare area on the first surface is not available.

16. The method as set forth in claim 12, wherein the dividing step further comprises the step of locating the spare areas for the plurality of data zones substantially in a central portion of each data zone.

17. A disk device comprising:
a spindle;
a motor for rotating the spindle;
an actuator which simultaneously moves a plurality of heads radially;
first and second recording disks mounted on the spindle and divided into a plurality of data zones with a spare data area in each data zone, each data zone including a plurality of tracks subdivided into sectors, the spare data areas on the first and second recording disks being aligned; and
a hard disk controller which assigns an alternate sector for a defective sector, the alternate sector being selected from the spare data area on the first recording disk where the defective sector is located if a spare sector is available on the first recording disk and if not available then from the spare data area on the second recording disk, the alternate sector being selected to have an angular offset from the defective sector which is greater than or equal to a predetermined angle.

18. The disk device of claim 17 wherein the hard disk controller first attempts to select the alternate sector by checking the sectors located N/2 sectors offset from the defective sector on each surface, where N is the total number of sectors per track.

19. The disk device of claim 18 wherein the hard disk controller checks the sectors located N/2+1 sectors offset from the defective sector if none of the sectors located N/2 sectors offset are available.

20. The disk device of claim 17 wherein the spare data areas in each data zone are located substantially in the center of each data zone.

* * * * *